Oct. 14, 1947. C. H. GEMBERLING 2,428,871
PLOW
Filed April 8, 1944 3 Sheets-Sheet 3
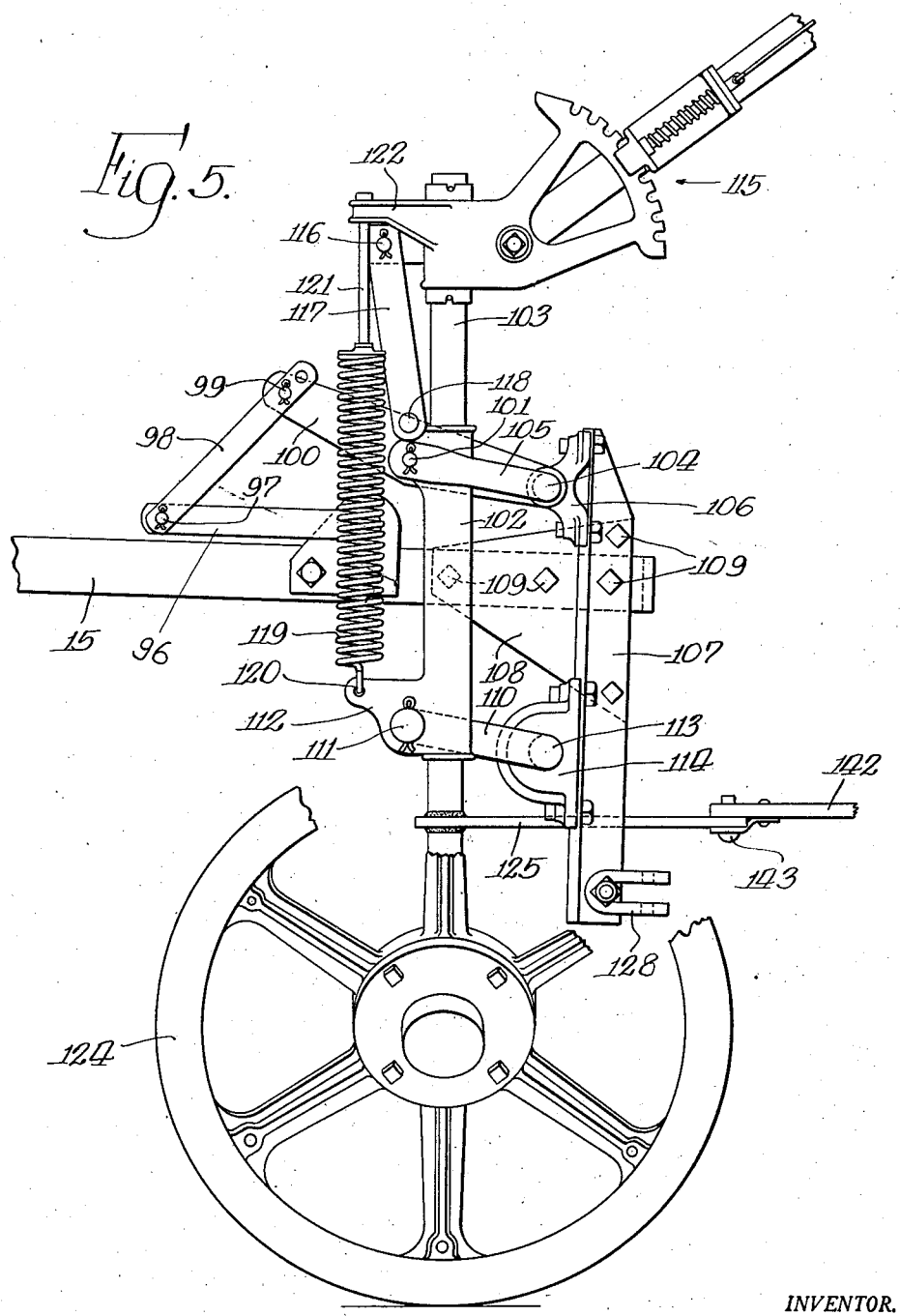
INVENTOR.
Cameron H. Gemberling,
BY John P. Smith
atty.

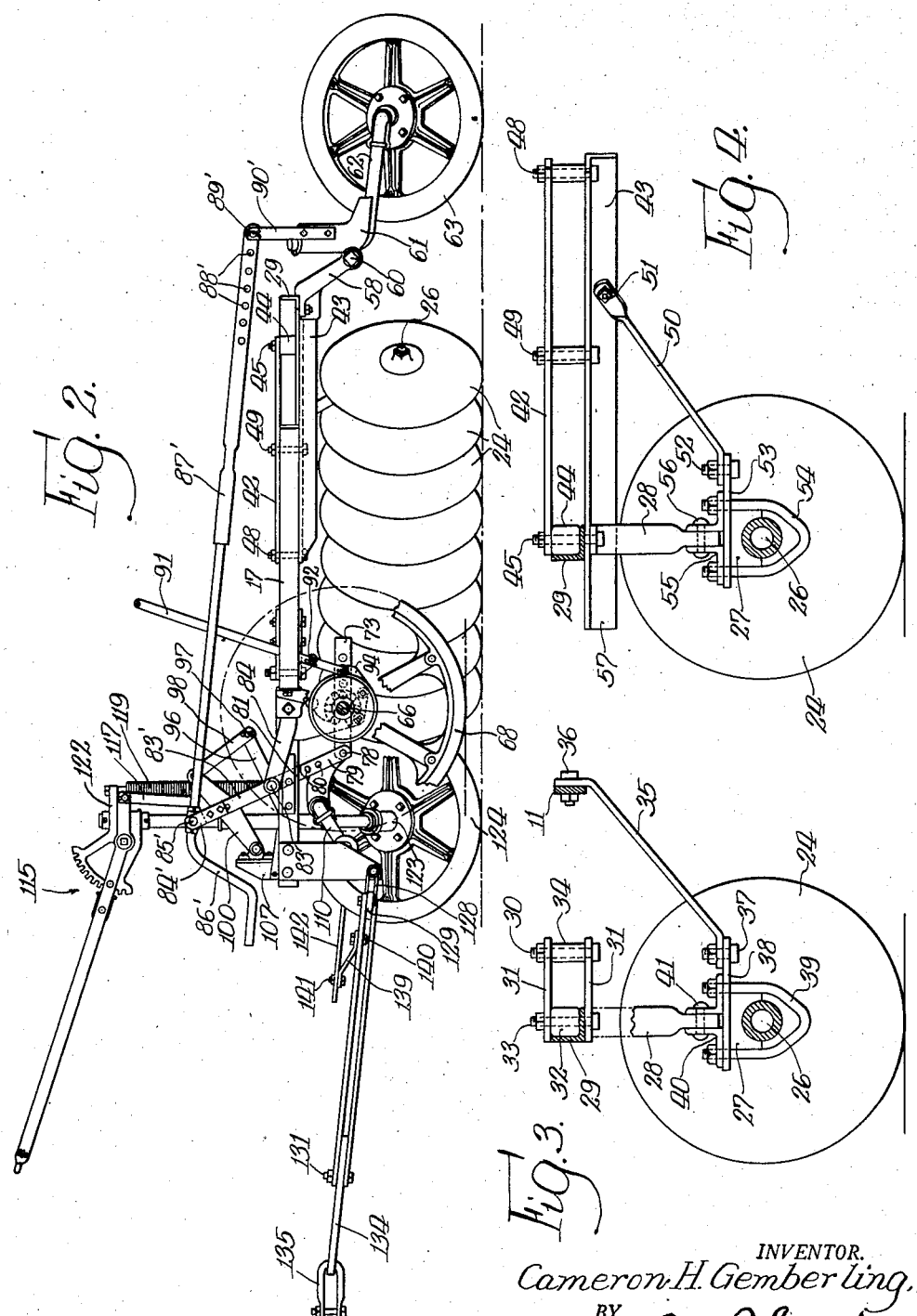

Patented Oct. 14, 1947

2,428,871

UNITED STATES PATENT OFFICE 2,428,871

PLOW

Cameron H. Gemberling, South Bend, Ind., assignor to The Oliver Corporation, a corporation of Delaware Application April 8, 1944, Serial No. 530,192

8 Claims. (Cl. 97—53)

The present invention relates generally to plows, but more particularly to the one-way type of disc plow whereby the angle of the disc gang may be adjusted with respect to the line of travel of the plow so as to accommodate the plow to various soil conditions.

A further object of the invention is to provide a simple and efficient construction of one-way plow and a power lift mechanism therefor which will more effectively and efficiently meet the requirements of varying soil conditions.

A still further object of the invention is to provide a novel and improved construction of plow of the one-way disc gang type whereby the disc gang may be adjusted with respect to the main frame and the line of draft of the plow so that the discs of the plow will throw very little soil to cover the seed when the plow is used in connection with or has seed planting mechanism mounted thereon.

These and other objects are accomplished by providing a construction and an arrangement of the various parts in the manner hereinafter described and particularly pointed out in the appended claims.

Referring to the drawings:

Fig. 2 is a side elevational view of the same showing the discs lowered in ground engaging or operative position;

Fig. 3 is a detailed view taken on the line 3—3 in Fig. 1;

Fig. 4 is a detailed cross sectional view taken on the line 4—4 in Fig. 1; and

Fig. 5 is a fragmentary side elevational view of the front furrow wheel construction.

Figure 1:
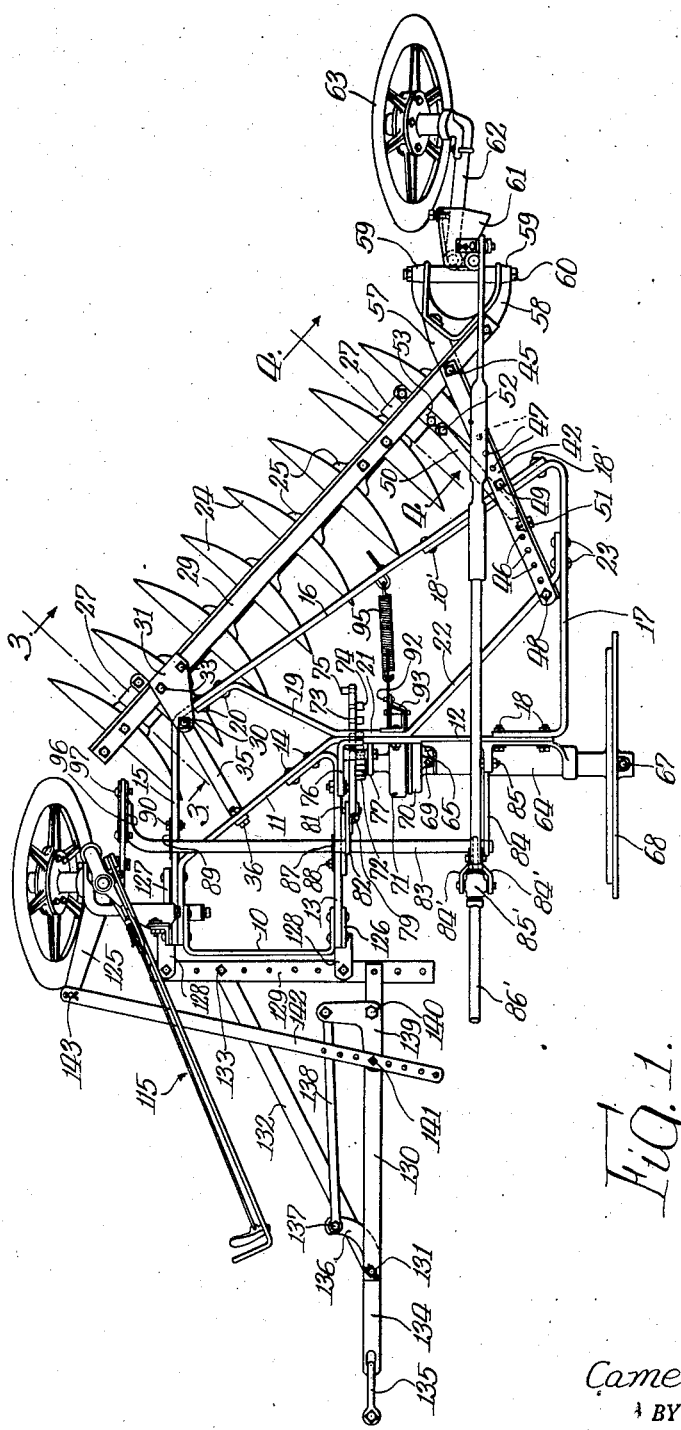
Fig. 1 is a top plan view of my improved plow construction.

In carrying out my invention, I have shown the same as comprising a transversely extending and substantially U-shaped frame member 10 which has one of its ends rigidly secured to a substantially diagonally extending frame member 11. The rear end of this frame member 11 terminates in a transverse portion 12 which is arranged at right angles to the line of travel of the plow. Secured to the other side of the U-shaped frame member 10 is a longitudinally extending main frame member 13 which has its rear end angularly disposed and secured to the diagonal frame member 11 by rivets as shown at 14. Secured to the forward end of the diagonal frame member 11 is a longitudinally extending side frame member 15, which in turn, has its rear portion terminating in a diagonally extending main frame member 16. The landward ends of the main frame members 12 and 16 are reinforced and braced by a substantially U-shaped frame member 17, which has its forward end secured to the transverse frame member 12 by means of bolts 18 and its rearward end secured to the member 16 by bolts 18'. A reinforcing angularly disposed brace member 19 has one end thereof secured by means of rivets 20 at one end of the diagonal frame member 16 and an intermediate portion, as shown at 21, secured to an intermediate portion of the frame member 12. An outwardly extending and diagonal portion of the frame member 19, as shown at 22, has its outer end riveted, as shown at 23, to the U-shaped frame member 17. The construction thus far described, constitutes in effect the main frame of my improved plow construction. One important feature in the present invention involves the manner in which the disc gang of the one-way plow of the power lift type may be pivotally and adjustably attached to the main frame of the plow and in which the rear furrow wheel is adjusted with the gang with respect to the plow frame. The disc gang in this instance comprises the usual series of concavo-convex discs 24 which are laterally spaced apart with the usual spools or spacers 25 on a shaft or bolt 26. The disc shaft is supported adjacent its opposite ends by the usual bearing brackets 27 which, in turn, are connected by hangers 28 to the gang frame member 29. The gang frame 29 is pivoted to the rear furrow side corner of the main frame on a bolt 30 mounted in two vertically spaced plates 31. The space plates 31 are held in spaced relation and secured to the gang frame member 29 by a block 32 and bolts 33. The forward end of the plates 31 are held in spaced relation by spacer tube 34 which surrounds the bolt 30. It will be observed that the spacer tube pivotally contacts the inside corner of the frame member 15—16. The downwardly projecting draft brace 35 has its upper and forward end connected by means of a bolt 36 to the frame member 11. The lower and rear end of the brace member 35 is pivotally connected by a shoulder bolt 37 in vertical alignment with the upper bolt 30. The bolt 37 pivotally connects the brace member 35 to a bearing plate 38 which, in turn, is secured to the gang shaft bearing 27 by means of a U-bolt 39. This U-bolt also secures a hanger bracket 40 to the bearing 27. The bracket 40 is provided with spaced apart apertured ears between which the lower end of the hanger 28 is attached by means of a bolt 41. (See Fig. 3 of the drawings.)

The other end of the gang frame 29 is adjustably connected to the land side of the main plow frame through the medium of an upper flat bar 42 and the lower vertically spaced bar in the form of an angle 43. The rear ends of the bars 42 and 43 are held in vertically spaced relation with respect to each other by a spacer block 44 which is secured in place, together with the bar 42 and 43 to the rear end of the gang frame 29 by a bolt 45. The bars 42 and 43 are provided with a plurality of uniformly spaced and aligned apertures 46 and 47 so that the position of the bolts 48 and 49 respectively may be changed to their proper position in adjusting the angle of the disc gang with respect to the main frame of the plow. A downwardly and rearwardly extending draft brace 50 has its forward end secured by means of a bolt 51 to the angle bar 43 and its lower end secured by means of a bolt 52 on the bearing plate 53. (See Fig. 4 of the drawings.) A bearing plate 53 is secured to the rear bearing bracket 27 by a U-bolt 54, the latter of which also secures the hanger bracket 55 to the bearing bracket. The hanger bracket 55 is provided with spaced apart apertured ears to which is secured by means of a bolt 56, the lower end of the rear hanger 28. Secured to the rear end of the gang frame 29 and a rearwardly extending portion 57 of the bar 43 is a rear axle supporting bracket 58 which is in the form of two rearwardly diverging and spaced apart bearings 59. Pivotally mounted in the bearings 59 by means of a bolt 60 is a rear axle bracket, generally indicated by the reference character 61, which in turn, pivotally supports an angularly disposed furrow wheel axle 62. Journaled on the rear end of the axle 62 is the usual furrow wheel 63.

From the above description it will be readily seen that the disc gang frame 29 together with the rear furrow wheel may be angularly adjusted with respect to the main frame on the aligned pivots 36 and 37 by merely removing the bolts 48 and 49 from the bars 42 and 43 and then moving the main frame by a rearward or forward movement of the tractor. After the proper angle of the gang frame is secured, the bolts 48 and 49 may be inserted in the proper aligned apertures 46 and 47 so that the bolt 48 engages the forward side of the main frame member 22 and the bolt 49 engages the rear side of the main frame member 16. The series of apertures of these bars permit the gangs to be angled at the desired angle with respect to the main frame for tilling the soil in accordance with the conditions encountered.

My improved power lift and its location with respect to the other parts of the plow will next be described. This power lift mechanism includes a bearing bracket 64 which is secured to the main frame member 12 by bolts 18 and 65. Journaled in the bearing bracket is a land wheel axle 66. Secured to the outer end of the axle 66 by means of a bolt 67 is a land wheel 68. Secured to the inner end of the axle 66 by means of a set screw 69 is a continuously rotating clutch member 70. Journaled on the inner end of the axle 66 and cooperating with a continuously rotating clutch member 70 is an intermittently actuated clutch member 71. Formed integrally with the intermittently actuated clutch member 71 is a pinion 72. Cooperating with and driven by the pinion 72 is a reciprocating rack bar 73 which has a series of pins or lugs 74 on one side thereof for engagement with the teeth of the pinion. Positioned on the rear end of the rack bar 73 and on the side opposite the pins 74 is a rear pin or lug 75 which is adapted to cooperate with and engage a guide rack plate 76 secured to the frame members 12 and 13 of the main frame. A second guide plate 77 is secured to and spaced from the first guide plate 76 and cooperates therewith for maintaining the pins or lugs of the rack bar in constant engagement with the pinion 72. The details and functions of operation of this improved rack bar and pinion are fully disclosed in my copending application, Serial No. 530,191, filed April 8, 1944, and further information on this construction can be had by reference thereto. The forward end of the rack bar is pivotally connected, as shown at 78, between an offset bracket 79 and the lower end of a lever 81. The bracket 79 is secured by means of bolts to the lever 81, which in turn is welded at 82 to a crank or rock shaft 83. The landward end of the crank shaft 83 is journaled in a bearing bracket 84, which in turn has its rear end secured to an apertured ear on the bearing bracket 64 by a bolt 85. An intermediate portion of the crank shaft 83 is journaled in the bearing bracket 87 secured to the main frame member 13 by a bolt 88. The furrow side of the crank shaft 83 is journaled in a bearing bracket 89 secured to the main frame member by a bolt 90. The clutch mechanism is tripped to either raise or lower the plow by a complete revolution of the intermittently driven clutch member 71 by a trip lever 91 which may have a cord extending from the upper end thereof to within easy reach of the operator on the tractor. The lever 91 is pivotally connected at 92 to a bracket 93 connected to the main frame 22 of the plow. The lower end of the lever is normally actuated into the path of the clutch pawl 94 by a spring 95 which has one end thereof connected to the lever and the other end thereof connected to the main frame 16 of the plow. The furrow side end of the shaft 83 is provided with a crank arm 96, to the free end of which is connected, as shown at 97, an adjustable link 98. The other end of the link 98 is pivotally connected as shown at 99 to a lever 100. The lever 100 is pivotally connected as shown at 101 to a bearing on a vertically movable sleeve 102. The sleeve 102 is slidably mounted on a vertical shank of a front furrow wheel axle 103. The forward end of the lever 100 is rigidly secured or welded to a shaft 104 which has a crank or link 105 formed integrally therewith. The crank 105 and a forward arm of the lever 100 are laterally spaced in position on the opposite side of the sleeve 102 and engages a common pivot pin 101. The shaft 104 is pivotally mounted in a bearing bracket 106, which in turn, is rigidly secured to a vertically extending angle member 107. The angle 107 is rigidly secured to the forward end of the main frame member 15 by a bracing plate 108 and bolts 109. A second link in the form of a crank 110 is pivotally connected as shown at 111 to a bearing portion 112 formed on the lower end of the sleeve 102. The forward end of the link 110 is pivotally connected as shown at 113 to a bearing bracket 114 secured to the lower end of the vertically extending angle 107. The upper link 105, together with the forward end of the lever 100 and the lower link 110 forms in effect a parallel link mechanism to insure the vertical movement of the frame with respect to the front furrow wheels when the plow frame is raised or lowered with respect to both furrow wheels in the manner hereinafter described. The front furrow wheel is provided with the usual manually adjusted mechanism for regulating the depth penetration of the discs at the front end of the plow frame. This mechanism includes the usual detent mechanism and locking sector, generally indicated by the reference character 115. The rear end of the lever, below the pivot thereof, is pivotally connected, as shown at 116, to links 117 which have their lower ends, as shown at 118 pivotally connected to an apertured ear formed on the upper end of the sleeve 102. Part of the weight of this frame structure of the plow is balanced by the extension spring 119 which has its lower end connected as shown at 120 to an apertured ear formed on the lower end of the sleeve 102. The upper end of the spring is adjustably connected by a bolt 121 to an apertured lug 122 formed on the sector. The lower end of the axle 103 has an angularly disposed shank on which the front furrow wheel 124 is journaled. Welded to the lower end of the vertical shank 103 is a forwardly extending crank arm 125.

The draft frame for the plow includes two vertically depending plates 126 and 127 which are rigidly secured to their respective frame members 13 and 15 and pivotally connected to each of these depending plates are draft brackets 128. Adjustably secured to the draft brackets 128 is a transverse draft bar 129. Secured adjacent one end of the draft bar 129 is a draft member 130. Connected as shown at 131 to the draft member 130 is a diagonal draft member or brace 132 which has its rear end as shown at 133 connected to the transverse draft bar 129. Pivotally connected at 131 to the forward ends of the draft members 130 and 132 is a second draft member 134 which is provided at its forward end with the usual draft clevis 135 for connecting the plow to the tractor draw bar. The rear end of the draft member 134 has an angularly disposed crank arm 136 which has its free end, as shown at 137, pivotally connected to the forward end of a link 138. The rear end of the link 138 is pivotally connected to a bell crank 139. The bell crank 139 is pivotally connected, as shown at 140, to the draft member 130. Pivotally connected to the other arm of the bell crank 139 as shown at 141 is one end of an adjustable connecting link 142 which has its other end as shown at 143 connected to the crank arm 125 on the front furrow wheel axle. Mounted to the crank shaft 83 adjacent the land wheel side thereof is an upwardly extending crank arm 83' which has secured to its free end, bifurcated or offset brackets 84' between which is swively mounted a hand crank bearing 85' in which is journaled conventional hand crank 86'. The rear end of the hand crank has a threaded shaft which is mounted in threaded engagement with an internally threaded sleeve, generally indicated by the reference character 87'. The rear end of the sleeve 87' is flattened and provided with a series of apertures as shown at 88' for adjustably and pivotally connecting the same as shown at 89' to the upward end of the lever 90', which in turn, has its lower end rigidly secured to the rear axle bracket 61.

Summarizing the advantages and novel features of operation of my improved disc plow, it will be obvious that should the operator desire to reduce or vary the angular displacement of the disc gang from the position in which it is shown in Fig. 1 of the drawings, the bolts 48 and 49 are first removed, and the pin 89' is also removed, and then by backing up the main frame with the movement of the tractor rearwardly, the landward side of the gang together with the furrow wheel 63 will be moved towards the main frame of the plow about its pivot 30 on the furrow side of the main frame and when the proper adjustment of the gang frame is secured, the bolts 48 and 49 may be replaced in the proper apertures of the respective members 42 and 43 so as to engage the forward and rearward sides of the main frame members 22 and 15 after which the pin 89' is inserted in the proper aperture 88' for connecting it with the lever 90' of the rear furrow wheel. During this operation, the bars 42 and 43 engage the upper and lower edges of the frame member 16 and 22 so as to guide the main frame with respect to the gang frame. This arrangement provides a simple adjustment for angling one-way disc gang plow to meet the varying soil conditions that are encountered in different communities. It will also be seen that my improved rack and pinion power lift mechanism directly associated with the land wheel axle and closely positioned to the crank shaft 83' which operates the parallel link mechanism for adjusting the front furrow wheels not only provides a compact arrangement, but also insures efficient operation and simplicity of control and adjustment of the operating parts.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. A plow comprising a main frame, a front furrow wheel adjustably connected to said main frame, parallel links forming the connection between said furrow wheel and said frame, a land wheel axle journaled on said frame, a land wheel secured to the outer end of said axle, a crank shaft journaled on said main frame, operative connections between said crank shaft and said parallel links, a power lift mechanism operatively connected to said land wheel axle and operatively connected to said crank shaft, a disc supporting gang frame pivoted at one side of and to the rear of said main frame, means for adjustably securing the other end of said gang frame to said main frame, a rear furrow wheel adjustably secured to said gang frame, and operative connections between said rear furrow wheel and said crank shaft for raising and lowering said plow.

2. A plow comprising a main frame, a front furrow wheel adjustably connected to said main frame, parallel links forming the connection between said furrow wheel and said frame, a land wheel axle journaled on said main frame, a land wheel secured to the outer end of said axle, a crank shaft journaled on said main frame, operative connections between said crank shaft and said parallel links, a power lift mechanism operatively connected to said land wheel axle and operatively connected to said crank shaft, a disc supporting gang frame pivoted at one side of and to the rear of said main frame, means for adjustably securing the other end of said gang frame to said main frame, a rear furrow wheel adjustably secured to said gang frame, and operative connections between said rear furrow wheel and said crank shaft for raising and lowering said plow, said last mentioned operative connections including manually adjusting means for regulating the depth penetration of the rear end of said plow.

3. A plow comprising a main frame, a front furrow wheel adjustably connected to said main frame, parallel links forming the connection between said furrow wheel and said frame, a land wheel axle journaled on said main frame, a land wheel secured to the outer end of said axle, a crank shaft journaled on said main frame, operative connections between said crank shaft and said parallel links, a power lift mechanism operatively connected to said land wheel axle and operatively connected to said crank shaft, a disc supporting gang frame pivoted at one side of and to the rear of said main frame, means for adjustably securing the other end of said gang frame to said main frame, a rear furrow wheel adjustably secured to said gang frame, and a hand screw adjustment mounted on said main frame and forming the connection between said rear furrow wheel and said crank shaft whereupon the actuation of said power lift mechanism, said furrow wheels are actuated to raise or lower said plow.

4. A plow comprising a main frame, a front furrow wheel adjustably connected to said main frame, parallel links forming the connection between said furrow wheels and said frame, a land wheel axle journaled on said frame, a land wheel secured to the outer end of said axle, a crank shaft journaled on said main frame, operative connections between said crank shaft and said parallel links, a power lift mechanism including a rack and pinion operatively connected to the inner end of said axle and to said crank shaft, a diagonally disposed gang frame having its furrow side end pivoted to said main frame and its landside end adjustably secured to said main frame, a plurality of spaced apart concavo-convexed discs carried by said gang frame, a rear furrow wheel adjustably secured to the rear end of said gang frame, and a manually adjustable connection between said crank and said rear furrow wheel whereupon the actuation of said power lift mechanism, said furrow wheels may be moved to raise or lower said plow.

5. A plow comprising a main frame having a diagonally extending rear frame member, a front furrow wheel adjustably connected to said main frame, a land wheel journaled on said main frame, a gang frame pivoted to the forward end of said frame member, a plurality of discs carried by said gang frame, means for adjustably connecting the other end of said gang frame to said frame member, a rear furrow wheel adjustably connected to the adjustable end of said gang frame for raising and lowering the rear end of said gang frame, and a power lift mechanism carried by said main frame and operatively driven by said land wheel, said power lift mechanism being operatively connected with said front and rear furrow wheels for raising and lowering said plow.

6. A plow comprising a main frame having a diagonally extending rear frame member, a front furrow wheel adjustably connected to said main frame, a land wheel journaled on said main frame forwardly of said member, a diagonally disposed gang frame pivoted at one end to said frame member, a plurality of discs carried by said gang frame, guide bars adjustably connecting the other end of said gang frame with said rear frame member, a rear furrow wheel connected to and adjustable with respect to said gang frame, and a power lift mechanism operatively driven by said land wheel and operatively connected to said furrow wheels for raising and lowering said plow.

7. A plow comprising a main frame having a diagonally extending rear frame member, a front furrow wheel adjustably connected to said main frame, a land wheel journaled on said main frame, a diagonally disposed gang frame having one end pivoted to said rear frame member, a plurality of discs carried by said gang frame, guide bars adjustably connecting the other end of said gang frame with said frame member, a rear furrow wheel adjustably connected to said gang frame, a crankshaft mounted on said main frame adjacent said front furrow wheel and operatively connected to said front and rear furrow wheels, a manually adjustable means mounted on said main frame and operatively connected to said rear furrow wheel for adjusting the depth penetration of the rear end of said plow, and a power lift mechanism operatively driven by said land wheel and operatively connected to said crankshaft for raising and lowering said plow.

8. A plow comprising a main frame having a diagonally extending rear frame member, a front furrow wheel adjustably connected to said main frame, a land wheel journaled on said main frame, a diagonally disposed gang frame pivoted at one end to said diagonal frame member, a plurality of discs carried by said gang frame, guide bars adjustably connecting the other end of said gang frame with said diagonal frame member, a rear furrow wheel adjustably connected to said gang frame, a crankshaft mounted on said main frame and operatively connected to said front and rear furrow wheels, a power lift mechanism including a rack and pinion mounted on said main frame and driven by said land wheel, and operative connections between said rack and said crankshaft for raising and lowering said plow.

CAMERON H. GEMBERLING.

REFERENCES CITED

The following references are of record in the file of this patent:

UNITED STATES PATENTS

| Number | Name | Date |
| --- | --- | --- |
| 1,073,827 | Waite | Sept. 23, 1913 |
| 1,472,637 | Dickinson | Oct. 30, 1923 |
| 1,480,273 | Krotz | Jan. 8, 1924 |